United States Patent
Traulsen et al.

(10) Patent No.: US 9,169,121 B2
(45) Date of Patent: Oct. 27, 2015

(54) ACTIVE MATERIAL FOR AN ELECTRODE OF A GALVANIC ELEMENT

(75) Inventors: Tim Traulsen, Pirna (DE); Gerd Fehrmann, Pirna (DE); Thomas Hucke, Locarno (CH); Andreas Deckert, Dresden (DE); Joerg Feller, Dresden (DE); Tom Schuffenhauer, Munich (DE)

(73) Assignee: LITRONIK Batterietechnologie GmbH, Pirna (DE)

( * ) Notice: Subject to any disclaimer, the term of this patent is extended or adjusted under 35 U.S.C. 154(b) by 648 days.

(21) Appl. No.: 13/550,757

(22) Filed: Jul. 17, 2012

(65) Prior Publication Data

US 2013/0022871 A1 Jan. 24, 2013

(51) Int. Cl.
| | |
|---|---|
| H01M 4/136 | (2010.01) |
| H01M 4/58 | (2010.01) |
| C01B 25/45 | (2006.01) |
| H01M 4/1397 | (2010.01) |
| H01M 4/36 | (2006.01) |
| H01M 10/052 | (2010.01) |

(52) U.S. Cl.
CPC .............. *C01B 25/45* (2013.01); *H01M 4/136* (2013.01); *H01M 4/1397* (2013.01); *H01M 4/364* (2013.01); *H01M 4/5825* (2013.01); *H01M 10/052* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 4,260,668 A | 4/1981 | Lecerf et al. | |
| 4,448,864 A | 5/1984 | Broussely | |

FOREIGN PATENT DOCUMENTS

| | | |
|---|---|---|
| DE | 10 2005 059 375 | 6/2007 |
| DE | 10 2006 021 158 | 11/2007 |
| EP | 2 017 910 | 1/2009 |
| WO | 2010063244 | 6/2010 |

OTHER PUBLICATIONS

European Search Report and Notes to the European Search Report on European Patent App. No. EP 12 17 3560, dated Nov. 13, 2012 (10 pages).
Yahia, Hamdi Ben, Gaudin, Etienne, Darriet, Jacques, (2006) "Comparison of the Crystal Structures and Magnetic Properties of the Low- and High-Temperature Forms of AgCuPO 4; Crystal Structure Determination, Magnetic Susceptibility Measurements, and Spin Dimer Analysis", Inorganic Chemistry, vol. 45, No. 14 (Jul. 1, 2006) pp. 5501-5509.
Quarton, Michel, Oumba, Marie-Therese, Freundlich, William, "Etude cristallochimique des orthophosphates doubles d'argent et d'un element bivalent", Revue de Chimie Minerale, Gauthier Villars, Paris, France vol. 21, No. 3 (Jan. 1, 1984) pp. 311-320.
Hase, Masashi, Matsuda, Masaaki, Kakurai, Kazuhisa, Ozawa, Kiyoshi, Kitazawa, Hideaki, Tsujii, Naohito, Donni, Andrease, Kuroe, Haruhiko, "Inelastic Neutron Scattering Study of the Spin-gap Cuprate [beta]-AgCuPO 4", Physical Review B, vol. 76, No. 13 (Oct. 1, 2007) PhysRevB.76.134403 (5 pages).

*Primary Examiner* — Jonathan Crepeau
(74) *Attorney, Agent, or Firm* — Buchanan Ingersoll & Rooney PC

(57) ABSTRACT

A material, in particular an active material, for an electrode of a galvanic element, and a method for the production of the material, a mixture for the production of an electrode for a galvanic element, and a galvanic element, in particular a battery, and a medical implant comprising such a battery.

15 Claims, 6 Drawing Sheets

ACTIVE MATERIAL FOR AN ELECTRODE OF A GALVANIC ELEMENT

CROSS-REFERENCE TO RELATED APPLICATIONS

This patent application claims the benefit of U.S. Provisional Patent Application No. 61/509,124, filed on Jul. 19, 2011, the disclosure of which is hereby incorporated by reference in its entirety.

TECHNICAL FIELD

The present invention generally relates to a material, in particular an active material, for an electrode of a galvanic element, a method for the production of said material, a mixture for the production of an electrode for a galvanic element, and a galvanic element, in particular a battery, and a medical implant comprising such a battery. A further aspect of the present invention relates to a chemical compound represented by the formula $Me_xCu_{n-x/2}P_2O_{5+n}$ (I) and the production and use of such chemical compounds.

BACKGROUND

As the power supply for a medical implant comprising electronic components (e.g., a cardiac pacemaker having wireless, and preferably bidirectional remote data transmission), galvanic elements such as, for example, batteries are required that have a large capacity and permit a high discharging current (e.g., in the mA range) to be drawn. High battery capacity extends the service life of the medical implant, thereby reducing the number of surgeries required to replace the battery and/or the implant. Additionally, a high discharging current (current pulse) must be drawn at least briefly for remote data transmission.

Implants used in human medicine for cardiac therapy are typically programmed during the implantation procedure. The programming is usually performed using a programming head which must be positioned directly over the implant. Since said programming head cannot be sterilized for use in the operating room, it must be embedded in a sterile casing. To avoid the effort required to bring a programming head into the operating room in a sterile manner, a new generation of medical implants for cardiac therapy will permit the implant to be programmed using radio signals. The battery of the implant must have a particularly high power density at the beginning of the discharge for said programming, which is carried out wirelessly. To attain said high power densities, the voltage of the battery used for the power supply should be as high as possible, and the internal resistance thereof should be as low as possible.

Galvanic elements such as, for example, batteries are electrochemical energy accumulators and energy converters. The basic components of a galvanic element are: a first electrode which comprises or is composed of a first active material; a second electrode which comprises or is composed of a second active material; and an electrolyte which connects the two electrodes. In the discharge process, the stored chemical energy is converted to electrical energy by an electrochemical redox reaction involving the oxidation of the first active material with release of electrons at a first electrode (e.g., anode, negative electrode in terms of the discharge process), and the reduction of the second active material with acquisition of electrons at a second electrode (e.g., cathode, positive electrode in terms of the discharge process), thereby enabling current to be drawn from the galvanic element.

The capacity (the quantity of electricity that can be drawn), voltage, internal resistance, and other parameters of galvanic elements are influenced to a considerable extent by the composition of the active materials used in the electrodes. "Active materials" refers exclusively to those components of the electrodes of the galvanic element that are oxidized (at the anode) or reduced (at the cathode) upon discharge of the galvanic element, and that deliver electrical current via said electrode reactions. The active material of the cathode can comprise one or more reducible substances, and/or the active material of the anode can comprise one or more oxidizable substances.

In addition to the active materials defined above, the electrodes of galvanic elements typically contain further components that do not participate in the current-sourcing electrode reactions, and therefore do not contribute to the capacity of the galvanic element, but that are required for the reliable operation of the galvanic element, such as, for example, electronically conductive additives for increasing electronic conductance within the electrode, and/or binding agents to increase the robustness of the electrode.

Foreign patent application documents DE 10 2006 021 158 A1, DE 10 2005 059 375 A1, and EP 2 017 910, and U.S. Pat. No. 4,260,668 make known a battery comprising a positive electrode which contains copper oxyphosphate as the active material. Additionally, U.S. Pat. No. 4,448,864 discloses a lithium-manganese dioxide battery, the positive electrode of which contains manganese dioxide and copper oxyphosphate. Such batteries are suited, inter alia, for use to supply power to medical implants. Due to the above-described trends in the development of medical implants for, in particular, cardiac therapy, it is necessary to increase the voltage of such galvanic elements, in particular in the initial stage of the discharge process, and to increase the loadability upon discharge using current pulses.

The present invention is directed toward overcoming one or more of the above-identified problems.

SUMMARY

A problem is solved, in accordance with the present disclosure, by a material, in particular an active material, for an electrode of a galvanic element, wherein the material according to the present invention comprises one or more compounds represented by the formula $Me_xCu_{n-x/2}P_2O_{5+n}$ (I), or is composed thereof, wherein the following applies for the formula (I):

Me is a monovalent metal, such as, for example, silver
$1 < x \leq 6$
$1 < n \leq 6$
$n > x$ In the compound(s) represented by formula (I), the monovalent metal Me is preferably silver.

In the compound(s) represented by formula (I), x is preferably equal to 2.

In the compound(s) represented by formula (I), n is preferably equal to 3 or 4.

A particularly preferred material according to the present invention contains a compound (I) represented by the formula $Ag_2Cu_2P_2O_8$ (Ia) and/or a compound (I) represented by the formula $Ag_2Cu_3P_2O_9$ (Ib).

In addition to one or more compounds having the above-defined composition (I), an active material according to the present invention for an electrode of a galvanic element can comprise one or more further chemical compounds that are reduced electrochemically in the discharge process, such as, for example, manganese dioxide.

In the preferred embodiments thereof, the active material according to the present invention contains the following in addition to one or more compounds having the above-defined composition (I):
  one or more compounds represented by the formula $Cu_mP_2O_{5+m}$ (II), whereby the following applies for formula (II): $1<m\leq 6$
  and, optionally, one or more additional substances that are reduced electrochemically in the discharge process, such as, for example, manganese dioxide.

In a preferred embodiment, the material according to the present invention is composed of one or more compounds represented by the formula $Me_xCu_{n-x/2}P_2O_{5+n}$ (I) as defined above, and one or more compounds represented by the formula $Cu_mP_2O_{5+m}$ (II) as defined above.

Of the compounds represented by the formula (II), the compounds having a high copper content are preferable due to the high theoretical capacity and high true density thereof. The compound represented by the formula (II) with m equal to 4, $Cu_4P_2O_9$ (IIa), is particularly preferred.

The active material according to the present invention preferably comprises at least one continuous phase and at least one disperse phase.

In said preferred embodiments, the material according to the present invention comprises a continuous phase represented by the formula $Cu_mP_2O_{5+m}$ (II) as defined above, and one or more disperse phases represented by the formula $Me_xCu_{n-x/2}P_2O_{5+n}$ (I), or is composed of a continuous phase represented by the formula $Cu_mP_2O_{5+m}$ (II) as defined above, and one or more disperse phases represented by the formula $Me_xCu_{n-x/2}P_2O_{5+n}$ (I) as defined above.

In a particularly preferred embodiment, the material according to the present invention comprises a continuous phase represented by the formula $Cu_4P_2O_9$ (IIa) and a disperse phase represented by the formula $Ag_2Cu_2P_2O_8$ (Ia) and/or a disperse phase represented by the formula $Ag_2Cu_3P_2O_9$ (Ib), or is composed of a continuous phase represented by the formula $Cu_4P_2O_9$ (IIa), and a disperse phase represented by the formula $Ag_2Cu_2P_2O_8$ (Ia) and/or a disperse phase represented by the formula $Ag_2Cu_3P_2O_9$ (Ib).

The composition of the particular phases can be identified radiographically ("XRD").

In the material according to the present invention, the portion of silver in the disperse phase represented by the formula (Ia) or (Ib) is approximately 1 mol % to 10 mol %, and preferably 5 mol %, based on the content of copper in the continuous phase represented by the formula (IIa).

The preferred materials according to the present invention, which are described above and comprise or are composed of a continuous phase represented by the formula $Cu_4P_2O_9$ (IIa) and a disperse phase represented by the formula $Ag_2Cu_2P_2O_8$ (Ia) and/or a disperse phase represented by the formula $Ag_2Cu_3P_2O_9$ (Ib) can be obtained by solid-phase synthesis, wherein the following are used as starting materials: copper oxide CuO, a compound of the selected monovalent metal (preferably an oxide or a thermally decomposable salt, e.g. $AgNO_3$, $Ag_2CO_3$), and a thermally decomposable salt containing phosphate ions, such as, for example, ammonium hydrogenphosphate $(NH_4)_2HPO_4$ in a stoichiometry that is appropriate for the desired composition.

The materials according to the present invention, in particular the preferred embodiments thereof, are suitable for use as active material for an electrode of a galvanic element, or as a component of a mixture according to the present invention for the production of an electrode for a galvanic element.

A further aspect of the present invention relates to a chemical compound represented by the formula $Me_xCu_{n-x/2}P_2O_{5+n}$ (I), wherein the following applies for formula (I):
  Me is a monovalent metal, such as silver
  $1<x\leq 6$
  $1<n\leq 6$
  $n>x$.

In the compound represented by formula (I), the monovalent metal Me is preferably silver.

In the compound represented by formula (I), x is preferably equal to 2.

In the compound represented by formula (I), n is preferably equal to 3 or 4.

A particularly preferred compound according to the present invention is represented by the formula $Ag_2Cu_2P_2O_8$ (Ia). A further particularly preferred compound according to the present invention is represented by the formula $Ag_2Cu_3P_2O_9$ (Ib).

The compounds according to the invention can be obtained by solid-phase synthesis, wherein the following are used as starting materials: copper oxide CuO, a compound of the selected monovalent metal (preferably an oxide or a thermally decomposable salt, e.g. $AgNO_3$, $Ag_2CO_3$), and a thermally decomposable salt containing phosphate ions, such as ammonium hydrogenphosphate $(NH_4)_2HPO_4$ in a stoichiometry that is appropriate for the desired composition.

The compounds according to the present invention represented by the formula $Me_xCu_{n-x/2}P_2O_{5+n}$ (I), in particular the preferred embodiments thereof, $Ag_2Cu_2P_2O_8$ (Ia) and $Ag_2Cu_3P_2O_9$ (Ib), are suitable for use as active material for an electrode of a galvanic element, and as a component of an active material according to the present invention for an electrode of a galvanic element, or as a component of a mixture according to the present invention for the production of an electrode of a galvanic element.

The above-described preferred compounds according to the present invention, and the above-described preferred materials according to the present invention are preferably obtainable by using the method of solid-phase synthesis. A method for the production of a compound according to the present invention, and/or an active material according to the present invention comprises the following steps:
  providing a mixture comprising the starting materials;
    copper oxide CuO;
    a thermally decomposable salt containing phosphate ions, such as, for example, ammonium hydrogenphosphate $(NH_4)_2HPO_4$; and/or
    a silver compound (preferably an oxide or a thermally decomposable salt, such as $AgNO_3$, $Ag_2CO_3$);
  in a stoichiometry that is appropriate for the desired composition;
  homogenizing the mixture;
  providing a single-step or multi-step thermal treatment of the mixture, wherein the number, the particular duration, and the particular temperature of the steps of the thermal treatment are selected such that the desired compound, according to the present invention, represented by the formula $Ag_2Cu_2P_2O_8$ (Ia) and $Ag_2Cu_3P_2O_9$ (Ib), or the desired material according to the invention is formed of a continuous phase represented by the formula $Cu_4P_2O_9$ (IIa) and a disperse phase represented by the formula $Ag_2Cu_2P_2O_8$ (Ia) or $Ag_2Cu_3P_2O_9$ (Ib); and
  homogenizing the thermally treated mixture, if necessary.

Basically, the starting materials are mixed as homogenously as possible and then undergo thermal treatment at sufficiently high temperatures and for a sufficiently long period of time. During this process, one or more compounds represented by the formula $Me_xCu_{n-x/2}P_2O_{5+n}$ (I) as defined above, in particular $Ag_2Cu_2P_2O_8$ (Ia) and/or $Ag_2Cu_3P_2O_9$ (Ib) are created, wherein, depending on the composition of the mixture comprising the starting materials, and on the temperature and duration of the thermal treatment, compounds are obtained that have the composition $Me_xCu_{n-x/2}P_2O_{5+n}$ (I), either as a pure phase or a disperse phase, in a continuous phase represented by the formula $Cu_mP_4O_{5+m}$ (II), and in particular $Cu_4P_2O_9$ (IIa). The reaction mixture that is obtained is homogenized after the thermal treatment, if necessary.

Preferably, the thermal treatment of the homogenized mixture comprising the starting materials takes place in a porcelain, corundum, or quartz glass crucible. Of course other crucibles may be used. The thermal treatment typically comprises several—three, in particular—steps, wherein the temperature of the thermal treatment increases from the first step to the last step, and preferably from the first step to the third step, but is held constant during each treatment step.

Preferably, the first step of the thermal treatment involves tempering the homogenized mixture comprising the starting materials at a temperature in the range of approximately 120 to 200° C., preferably 160° C., over a period of approximately 20 to 60 hours, preferably 48 hours. Preferably, the second step of the thermal treatment involves tempering the homogenized mixture comprising the starting materials at a temperature in the range of approximately 250 to 350° C., preferably 290° C., over a period of approximately 20 to 60 hours, preferably 48 hours. The temperature and duration of the third step of the thermal treatment depend on the composition of the desired compound according to the present invention, for example, $Me_xCu_{n-x/2}P_2O_{5+n}$ (I), or on the desired composition and quantity of the disperse phase represented by the formula $Me_xCu_{n-x/2}P_2O_{5+n}$ (I) in a material according to the invention.

To obtain a material according to the present invention which comprises or is composed of a disperse phase represented by the formula $Me_xCu_{n-x/2}P_2O_{5+n}$ (I) and a continuous phase represented by the formula $Cu_mP_2O_{5+m}$ (II), the last step of the thermal treatment is carried out at a temperature in the range of approximately 600 to 800° C. over a period of approximately 10 to 20 days, wherein the mixture is homogenized at a frequency ranging from every day up to every fifth day (preferably every third day).

For example, the production of an active material according to the present invention having a silver portion of 1 mol % comprises three-step thermal treatment, including:
 a first step at approximately 160° C. for 48 hours;
 a second step at approximately 290° C. for 48 hours; and
 a third step at approximately 750° C. for 16 days.

For example, the production of an active material according to the present invention having a silver portion of 5 mol % comprises three-step thermal treatment, including:
 a first step at approximately 160° C. for 48 hours;
 a second step at approximately 290° C. for 48 hours; and
 a third step at approximately 750° C. for 13 days.

For example, the production of an active material according to the present invention having a silver portion of 10 mol % comprises three-step thermal treatment, including:
 a first step at approximately 160° C. for 48 hours;
 a second step at approximately 290° C. for 48 hours; and
 a third step at approximately 700° C. for 14 days.

The composition of the phases that are formed can be identified radiographically ("XRD").

To obtain a compound, according to the present invention, represented by the formula $Me_xCu_{n-x/2}P_2O_{5+n}$ (I) as a pure phase, the last step of the thermal treatment is carried out at a temperature in the range of approximately 600 to 670° C. over a period of approximately 5 to 15 days, preferably 12 days, wherein the mixture is homogenized at a frequency ranging from every day up to every fifth day (preferably every third day).

For example, the production of the compound $Ag_2Cu_2P_2O_8$ (Ia) according to the present invention comprises three-step thermal treatment, including:
 a first step at approximately 160° C. for 48 hours;
 a second step at approximately 290° C. for 48 hours; and
 a third step at approximately 600° C. for 5 to 15 days (preferably 12 days).

For example, the production of the compound $Ag_2Cu_3P_2O_9$ (Ib) according to the present invention comprises three-step thermal treatment, including:
 a first step at approximately 160° C. for 48 hours;
 a second step at approximately 290° C. for 48 hours; and
 a third step at approximately 670° C. for 5 to 15 days (preferably 12 days).

Preferably, the mixture is homogenized after every step of the thermal treatment, and is ground if necessary. At the conclusion of the thermal treatment, the mixture is homogenized once more, and is ground if necessary.

The material according to the present invention, and in particular in the preferred embodiments thereof, is suitable for use as active material for an electrode of a galvanic element, and in particular for a positive (in terms of the discharge process) electrode (cathode) of a galvanic element. During the discharge process, ions of the monovalent metal Me, e.g., silver, are first reduced to the elemental metal, and, as the discharge progresses, copper ions are reduced to metallic copper. Lithium ions are inserted in the crystal lattice of the active material of the positive electrode during discharge.

The method according to the present invention for the production of an active material for an electrode of a galvanic element on the basis of a solid-phase synthesis with a reaction mixture in which the starting materials are homogeneously distributed results in a material that has a high degree of dispersity. In the production of electrodes comprising the active material according to the present invention, it is therefore not necessary to take technical precautions to prevent the components of the active material from separating during processing, which could happen due, for example, to the different densities thereof. Due to the homogeneous distribution of the components within the active material according to the present invention, the electrodes are discharged in a homogeneous manner.

It is assumed that defect structures are produced in the preferred active materials according to the present invention due to the molecularly disperse distribution of the compound represented by the formula $Me_xCu_{n-x/2}P_2O_{5+n}$ (I), in particular $Ag_2Cu_2P_2O_8$ (Ia) and/or $Ag_2Cu_3P_2O_9$ (Ib), in the compound represented by the formula $Cu_mP_2O_{5+m}$ (II), in particular $Cu_4P_2O_9$ (IIa), which forms a continuous phase, said defect structures making it easier for ions to move in the grid structure of the active material according to the invention, as compared to the structure of the active material known from the prior art, $Cu_mP_2O_{5+m}$ (II). The present invention is not bound to this theory, however.

A further aspect of the present invention relates to a mixture for the production of an electrode for a galvanic element. The mixture according to the present invention for the production of an electrode for a galvanic element comprises:

(i) an active material according to the present invention, as described above or one or more compounds, according to the present invention, represented by the formula $Me_xCu_{n-x/2}P_2O_{5+n}$ (I) as described above, preferably one or both compounds of the group composed of $Ag_2Cu_2P_2O_8$ (Ia) and $Ag_2Cu_3P_2O_9$ (Ib), and (ii) one or more conductive additives and/or (iii) one or more binding agents and (iv) optionally, one or more dispersing agents or is composed of components (i), (ii) and/or (iii) and, optionally, (iv).

The mixture according to the present invention can be present, for example, as a solid mixture (without dispersing agent (iv)) or as a dispersion in a typically fluid dispersing agent (iv).

Electronically conductive materials that do not participate in the current-sourcing electrode reaction are used as conductive additives (ii). The function of the conductive additive or the conductive additives (ii) is to increase the electronic conductivity within the electrode, and to improve the electronic contact to the arrester (typically a metallic grid formed in the electrode, or a metallic foil) or to the electrode connection. This is achieved by way of a uniform, finely dispersed distribution of a particulate conductivity additive in the active material, and therefore the particles of the conductive additive (ii) form electronically conductive contacts between the particles of the active material according to the present invention or the compound according to the present invention, or between particles of the active material according to the present invention or the compound according to the present invention, and the arrester or connection. As a result, the ohmic resistance of the electrode and, therefore, the internal resistance of the galvanic element, are reduced overall.

In the mixture according to the present invention, the conductive additive or the conductive additives are preferably selected from the group comprised of graphite, carbon black, expanded graphite, carbon fibers, and metal powders.

To attain a homogeneous, finely dispersed distribution of the conductive additive or the conductive additives (ii) in the active material according to the present invention or the compound according to the present invention, and to attain reliable electronic contacting within the electrode, combinations of conductive additives are preferably used that have different particle sizes and shapes, such as, for example, expanded graphite in combination with spherical or plate-shaped graphite or carbon fibers in combination with spherical or plate-shaped graphite.

The quantity of the conductive additive(s) (ii) should be selected such that internal resistance is effectively reduced, but that the portion of the active material according to the present invention or the compound according to the present invention is not reduced to the point at which the capacity of the galvanic element is reduced to an unacceptable level. Preferably, the content of the conductive additive or the conductive additive(s) (ii) relative to the total mass of the mixture according to the present invention is in the range of approximately 0.1 to 20% by weight, and preferably 3 to 10% by weight.

The function of the binding agent or binding agents (iii) is to increase the coherence of the components of the electrode and, therefore, the mechanical robustness of the electrode. Polymers are suitable binding agents, for instance. In the mixture according to the present invention, the binding agent or binding agents are preferably selected from the group comprised of polytetrafluoroethylene (PTFE), polyvinylidene difluoride (PVDF), polyolefins, polyethylene oxide (PEO), polyethylene (PE), polypropylene (PP), polyacrylates, and/or ethylene propylene diene monomer (EPDM).

The quantity of the binding agent(s) (ii) should be selected such that the required mechanical robustness is attained, but that the portion of the active material according to the present invention or the compound according to the present invention is not reduced to the point at which the capacity of the galvanic element is reduced to an unacceptable level. Preferably, the content of the binding agent or binding agents (iii) relative to the total mass of the mixture according to the invention is in the range of approximately 0 to 12% by weight, and preferably 1 to 8% by weight.

The mixture used to produce an electrode for a galvanic element is generally a dry mixture or a dispersion. To produce a mixture according to the present invention, the above-mentioned components (i), (ii) and/or (iii) and, if necessary, (iv), and further additives (e.g., magnesium oxide, lithium carbonate, etc.) are provided in accordance with their particular portions relative to the total mass of the mixture, and are mixed together homogeneously.

The mixture according to the present invention, in particular in the preferred embodiments thereof, is suitable for producing an electrode for a galvanic element according to the present invention.

The production of an electrode for a galvanic element according to the present invention comprises the following steps:

(a) providing a mixture (as described above) according to the present invention for producing an electrode for a galvanic element; and (b) hardening the mixture provided in step (a).

In step (b), the mixture according to the present invention, which was provided in step (a), can be hardened by, for example, uniaxial, biaxial, or isostatic pressing. Particularly preferably, the mixture provided in step (a) or the active material provided in step (a) is hardened using a plunger-die process. If necessary, step (b) can be followed by a drying step, such as, for example, vacuum drying. Preferably, vacuum drying is carried out for at least 8 hours at approximately 80 to 340° C., and preferably at temperatures between 120° C. and 180° C. If the hardened product obtained in step (b) does not have the desired shape for use as an electrode, the hardened and, if necessary, dried product can be brought into the desired shape using further processing steps, such as, for example, trimming to size. Reference is made to foreign patent application documents DE 10 2006 021 158 A1, DE 10 2005 059 375 A1, and EP 2 017 910 for further details regarding the production of the electrodes. They are incorporated by reference herein.

Coating processes with dispersions are suitable for use as an alternative method for producing the electrodes. To this end, a mixture according to the present invention is produced by dispersing (i) an active material according to the present invention or one or more compounds according to the present invention with one or more conductive additives (ii) and/or one or more binding agents (iii) in a dispersing agent (iv). The mixture according to the present invention, which is present in the form of a dispersion, is applied as a wet film using a wet-coating process, e.g., by roller application, knife-coating, a printing or casting method, onto an electronically conductive carrier, usually a metal foil, and is thereby hardened. The wet film is then dried and, optionally, compressed, e.g., by calendering.

A further aspect of the present invention relates to a galvanic element, preferably a battery, and in particular to supply power to a medical implant comprising electronic components. The galvanic element according to the present invention comprises an electrode, in particular a positive (in terms of the discharge process) electrode (cathode) composed of or comprising a mixture according to the present invention (as described above)
or
an active material according to the present invention (as described above)
or
one or more compounds, according to the present invention, represented by the formula $Me_xCu_{n-x/2}P_2O_{5+n}$ (I) as described above, preferably one or both compounds of the group composed of $Ag_2Cu_2P_2O_8$ (Ia) and $Ag_2Cu_3P_2O_9$ (Ib), Preferably, the active material of the second negative (in terms of the discharge process) electrode (anode) contains metallic lithium or is composed thereof. Alternatively, alloys of lithium can be used.

If lithium is used as the active material for the anode of the galvanic element according to the present invention, an anhydrous solution of a lithium compound, e.g., a lithium salt, in a non-aqueous organic solvent or in a mixture of non-aqueous organic solvents is typically used as the electrolyte. Salts having anions that are chemically slightly reactive or non-reactive are used preferably as lithium salts. Examples thereof are lithium hexafluorophosphate, lithium hexafluoroarsenate, lithium trifluoromethanesulfonate, lithium tetrachloroaluminate, lithium tetrafluoroborate, and/or lithium perchlorate.

The preferred solvents are compounds that have high solubility for the lithium salt to be used in the electrolyte, react chemically not at all or only slightly with the electrode materials, and that do not bring the electrode material into solution. Examples of typical solvents in electrolytes of lithium batteries are propylene carbonate, ethylene carbonate, dimethyl carbonate, diethyl carbonate, ethyl methyl carbonate, 2-methyltetrahydrofuran, dioxolane, γ-butyrolactone, acetonitrile, digylme, 1,2 dimethoxyethane, and dimethylformamide. Preferred solvents are, for example, dimethoxyethane, ethylene carbonate, and propylene carbonate. A particularly preferred electrolyte is a 1-molar solution of lithium perchlorate in a mixture of 1,2-dimethoxyethane, ethylene carbonate, and propylene carbonate (4:4:2).

The galvanic element according to the present invention, in particular in the preferred embodiments thereof, can be used, e.g., to supply power to a medical implant that contains electronic components. The medical implant is preferably selected from the group comprised of cardiac pacemakers, defibrillators, sensors for the measurement, recording, and transmission of physiological data, neurostimulators, orthopedic implants, metering pumps, and implants having a metering or valve function.

Preferably the galvanic element according to the present invention forms a battery that is preferably a component of a medical implant, such as, for example, a cardiac pacemaker or a cardiac stimulator.

A further aspect of the present invention therefore relates to a medical implant, in particular a medical implant for cardiac therapy, e.g., a cardiac pacemaker or a cardiac stimulator, comprising a galvanic element according to the present invention, and preferably a battery according to the present invention.

The use of a material according to the present invention as described above, or a compound according to the present invention as described above as the active material or as a component of an active material for an electrode, especially the positive (in terms of the discharge process) electrode (cathode) of a galvanic element results in various improvements over galvanic elements comprising copper oxyphosphate as the active material, which are known from the prior art.

During the discharge process, ions of the monovalent metal Me, e.g., silver, are first reduced to the elemental metal and, as the discharge progresses, the copper ions are reduced to metallic copper. The discharge of silver ions takes place at a higher voltage than does the discharge of copper ions. By varying the portion of the compound or compounds represented by the formula $Me_xCu_{n-x/2}P_2O_{5+n}$ (I), in particular $Ag_2Cu_2P_2O_8$ (Ia) and/or $Ag_2Cu_3P_2O_9$ (Ib) in the above-described preferred active materials according to the present invention, it is possible to adjust the quantity of electricity (capacity) that can be drawn from a galvanic element at the voltage which is higher compared to the discharge of copper ions. Particularly preferred embodiments of the galvanic element according to the present invention have a voltage of approximately 3.4 V across a resistance of 100 kOhm at the onset of the discharge.

The elemental metal, e.g., silver, that is formed in the initial stage of the discharge process via reduction of ions, improves electronic contacting within the electrode, thereby reducing the ohmic resistance thereof and, therefore, the internal resistance of the galvanic element overall. The elemental metal formed in the discharge process therefore behaves similarly to the above-described conductive additives (ii), although with the advantage that it is formed by a reaction which itself contributes to the capacity of the galvanic element. Moreover, the specific electrical resistance of the elemental metal formed in the discharge process is lower than the specific electrical resistance of the carbonaceous additives that are typically used.

Due to the high voltage and the rapid drop in internal resistance at the onset of the discharge process of a galvanic element according to the present invention, it is possible to attain the high power density desired, in particular when used as the power supply for medical implants at the onset of the discharge process.

It is assumed that defect structures are produced in the preferred active materials according to the invention due to the molecularly disperse distribution of the compound represented by the formula $Me_xCu_{n-x/2}P_2O_{5+n}$ (I), in particular $Ag_2Cu_2P_2O_8$ (Ia) and/or $Ag_2Cu_3P_2O_9$ (Ib), in the compound represented by the formula $Cu_mP_2O_{5+m}$ (II), in particular $Cu_4P_2O_9$ (IIa), which forms a continuous phase, said defect structures making it easier for ions to move in the grid structure of the active material according to the present invention, as compared to the structure of the active material known from the prior art, $Cu_mP_2O_{5+m}$ (II). As a result, even after the silver has been fully discharged, the voltage is higher upon discharge of the copper ions than is the case with a galvanic element having a cathode containing $Cu_mP_2O_{5+m}$ (II) without a disperse compound represented by the formula $Me_xCu_{n-x/2}P_2O_{5+n}$ (I), especially $Ag_2Cu_2P_2O_8$ (Ia) and/or $Ag_2Cu_3P_2O_9$ (Ib), as the active material. The present invention is not bound to this theory, however.

The relative high voltage and reduced internal resistance of the galvanic element according to the present invention that are present in the initial stage of the discharge process (discharge of the ions of the monovalent metal) and in the stage of discharge of copper ions results in high loadability in the case of pulse discharge. During loading by current pulses that are typical for data telemetry to external transmitters and receivers, the voltage of a galvanic element according to the present invention always remains so high that full operational reliability of the electronic components of the implant is ensured at all times. This is very significant, in particular, when the implant needs to transmit and receive data via RF telemetry during the implantation process, i.e., at the onset of the discharge of the galvanic element. Therefore, the high initial loadability of the galvanic element according to the present invention by current pulses while voltage is high is another significant technical advantage in terms of use to supply power to medical implants.

Embodiments

Further features, aspects, objects, advantages, and possible applications of the present invention will become apparent from a study of the embodiments and comparative examples described below, in combination with the Figures, and the appended claims.

DETAILED DESCRIPTION

Figure 1:
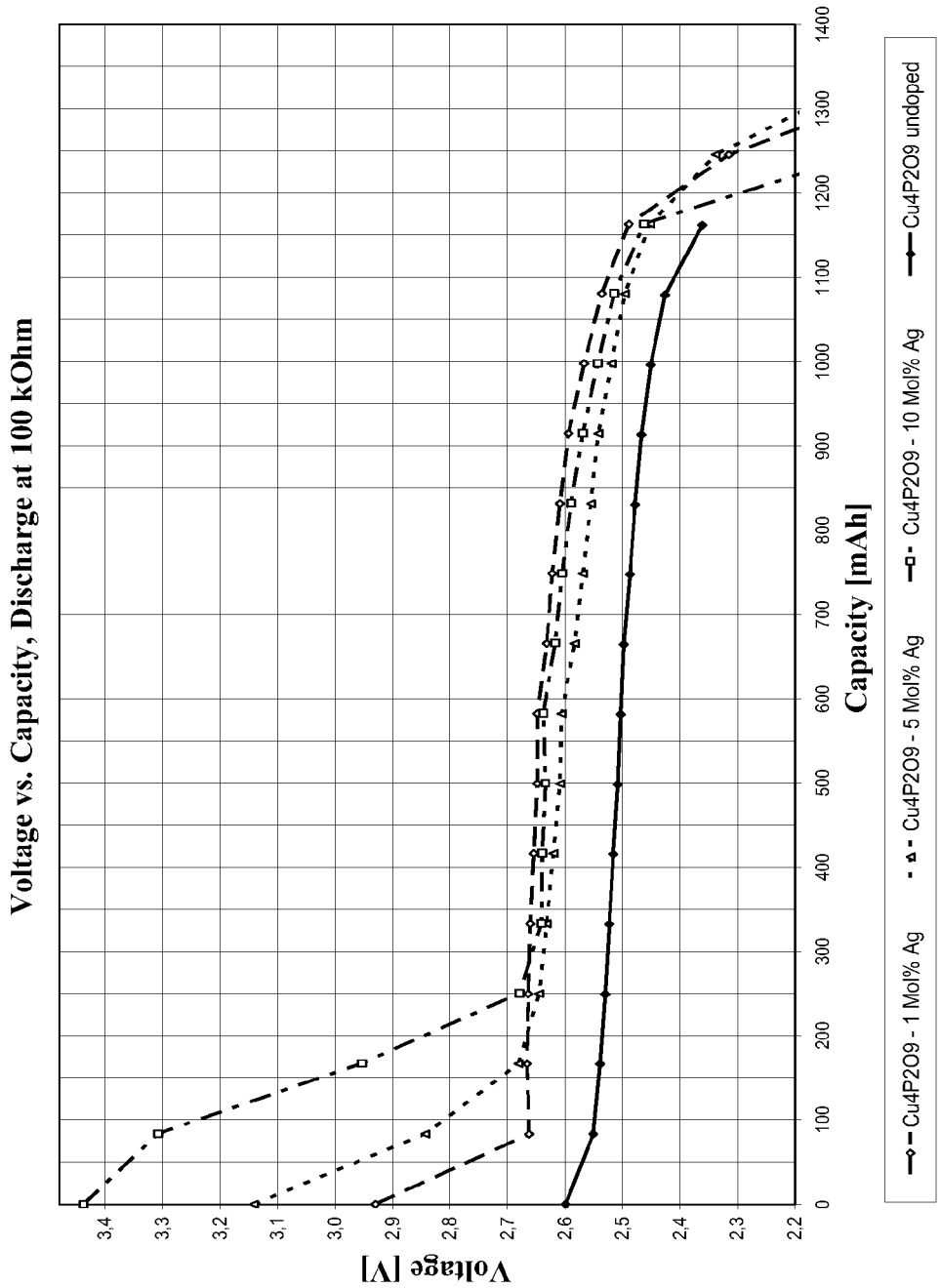
FIG. 1 shows the cell voltage of various batteries (comprising a cathode according to Embodiment 1, 2 or 3) according to the present invention and a battery (comprising a cathode according to the comparative example) that is not according to the present invention, as a function of the electric charge (capacity) that is drawn.
Figure 2:
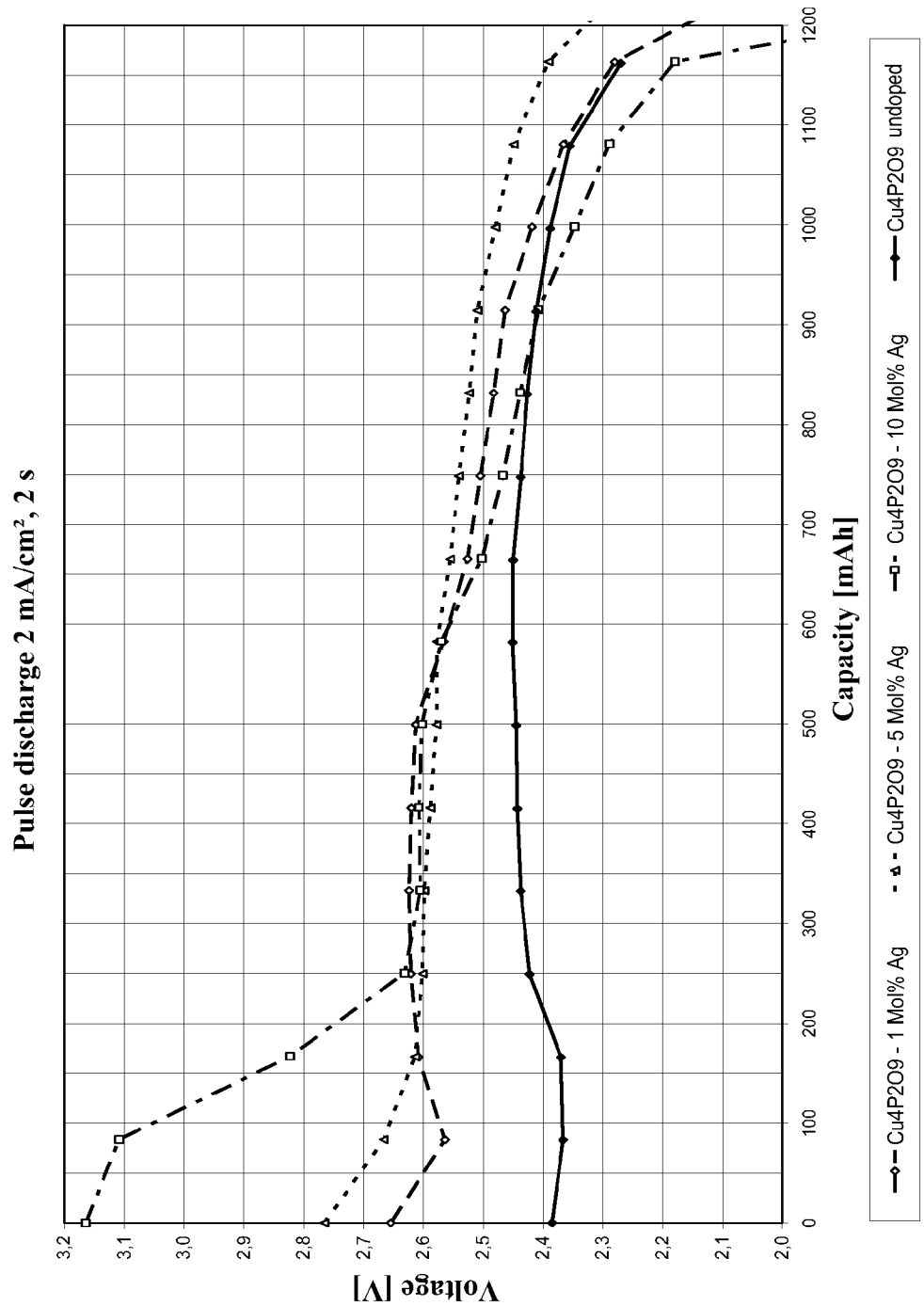
FIG. 2 shows the cell voltage of various batteries (comprising a cathode according to Embodiment 1, 2 or 3) according to the present invention and a battery (comprising a cathode according to the comparative example) that is not according to the present invention, as a function of the electric charge (capacity) that is drawn given pulse discharge (pulse current 2 mA/cm$^2$, pulse duration 2 sec).

For the Embodiments and Comparative Examples, galvanic elements were produced in the form of batteries having the following design:

| | Embod. 1 | Embod. 2 | Embod. 3 | Embod. 4 | Embod. 5 | Comp. Example |
|---|---|---|---|---|---|---|
| Active material of cathode | continuous: $Cu_4P_2O_9$ disperse: $Ag_2Cu_2P_2O_8$ (1 mol % Ag) | continuous: $Cu_4P_2O_9$ disperse: $Ag_2Cu_2P_2O_8$ (5 mol % Ag) | continuous: $Cu_4P_2O_9$ disperse: $Ag_2Cu_2P_2O_8$ (10 mol % Ag) | $Ag_2Cu_3P_2O_9$ | $Ag_2Cu_2P_2O_8$ | $Cu_4P_2O_9$ |
| Conductive additives of cathode | Graphite (3% by weight) and carbon fibers (2% by weight) | | | | | |
| Binding agent of cathode | Polytetrafluoroethylene (3% by weight) | | | | | |
| Electrolyte | 1-molar solution of $LiClO_4$ in a mixture of 1,2-dimethoxyethane, ethylene carbonate, and propylene carbonate (4:4:2). | | | | | |
| Anode | Lithium | | | | | |

The portions (in % by weight) of conductive additives and the binding agent of the cathodes are relative to the total mass of active material, conductive additives, and binding agent of the particular cathode.

In the active materials of the cathodes depicted in Embodiments 1 to 3, a phase represented by the formula $Ag_2Cu_2P_2O_8$ (Ia) according to the stated percentage of silver is distributed in a finely dispersed manner in a continuous phase represented by the formula $Cu_4P_2O_9$ (IIa). The percentages (in mol %) of silver in the particular active material are based on the content of copper contained in the active material compound (IIa). In the discharge process, the metal ions of both compounds, (Ia) and (IIa), are reduced.

The active materials of the cathodes depicted in Embodiments 1 to 3 are produced using a method comprising the following steps:
  providing a mixture of the starting materials copper oxide, ammonium hydrogenphosphate, and silver nitrate in stoichiometric quantities according to the desired composition, wherein the copper ions to be replaced are substituted by the charge-equivalent quantity of silver ions;
  homogenizing the mixture;
  tempering the homogenized mixture for approximately 48 hours at 160° C. in a porcelain, corundum, or quartz glass crucible;
  homogenizing and, if necessary, grind the mixture;
  tempering for approximately 48 hours at 290° C.;
  homogenizing and, if necessary, grinding the mixture;
  tempering further at approximately 600° C. to 800° C. for 10 to 20 days to obtain a material having the desired composition, in particular;
    for a silver content of 1 mol %: 16 days at 750° C. (Embodiment 1);
    for a silver content of 5 mol %: 13 days at 750° C. (Embodiment 2);
    for a silver content of 10 mol %: 14 days at 700° C. (Embodiment 3);
in every case, homogenizing the mixture at a frequency ranging from every day up to every fifth day (preferably every third day); and
  at the conclusion of the thermal treatment, homogenizing the mixture once more, and grinding if necessary.

The pure phase having the composition $Ag_2Cu_2P_2O_8$ (Ia) or $Ag_2Cu_3P_2O_9$ (Ib), which forms the active material of the cathode in the case of the cathode depicted in Embodiment 4 or 5, is produced using a method comprising the following steps:
  providing a mixture comprising the starting materials, e.g., copper oxide, ammonium hydrogenphosphate, and silver nitrate in stoichiometric quantities according to the empirical formula of the desired phase;
  homogenizing the mixture;
  tempering the homogenized mixture for approximately 48 hours at 160° C. in, for example, a porcelain, corundum, or quartz glass crucible;
  homogenizing and, if necessary, grinding the mixture;
  tempering for approximately 48 hours at 290° C.;
  homogenizing and, if necessary, grinding the mixture;
  tempering further to obtain the continuous phase;
    with composition (Ia) at approximately 600° C. for 5 to 15 days (preferably 12 days)
    or
    with composition (Ib) at approximately 670° C. for 5 to 15 days (preferably 12 days), in both cases, homogenizing the mixture at a frequency ranging from every day up to every fifth day (preferably every third day); and
  at the conclusion of the thermal treatment, homogenizing the mixture once more, and grinding if necessary.

The cathodes depicted in Embodiments 1 to 5 and the Comparative Example were produced as follows:
  dry mixing the active material with the appropriate quantities of the conductive additives and the binding agent to form a homogeneous mixture;
  compacting the homogeneous mixture using a plunger/die process; and
  vacuum-drying at approximately 140-180° C. for at least 8 hours.

The batteries depicted in Embodiments 1 to 5 and Comparative Example 1 were investigated in regard to the discharge characteristics thereof in base-load duty with a load of 100 kOhm, and in pulse operation (pulse current 2 mA/cm$^2$, pulse duration 2 sec). In addition, the change in internal resistance depending on the quantity of current (capacity) drawn was plotted. The results of these investigations are presented in FIGS. 1 to 6.

Figure 4:
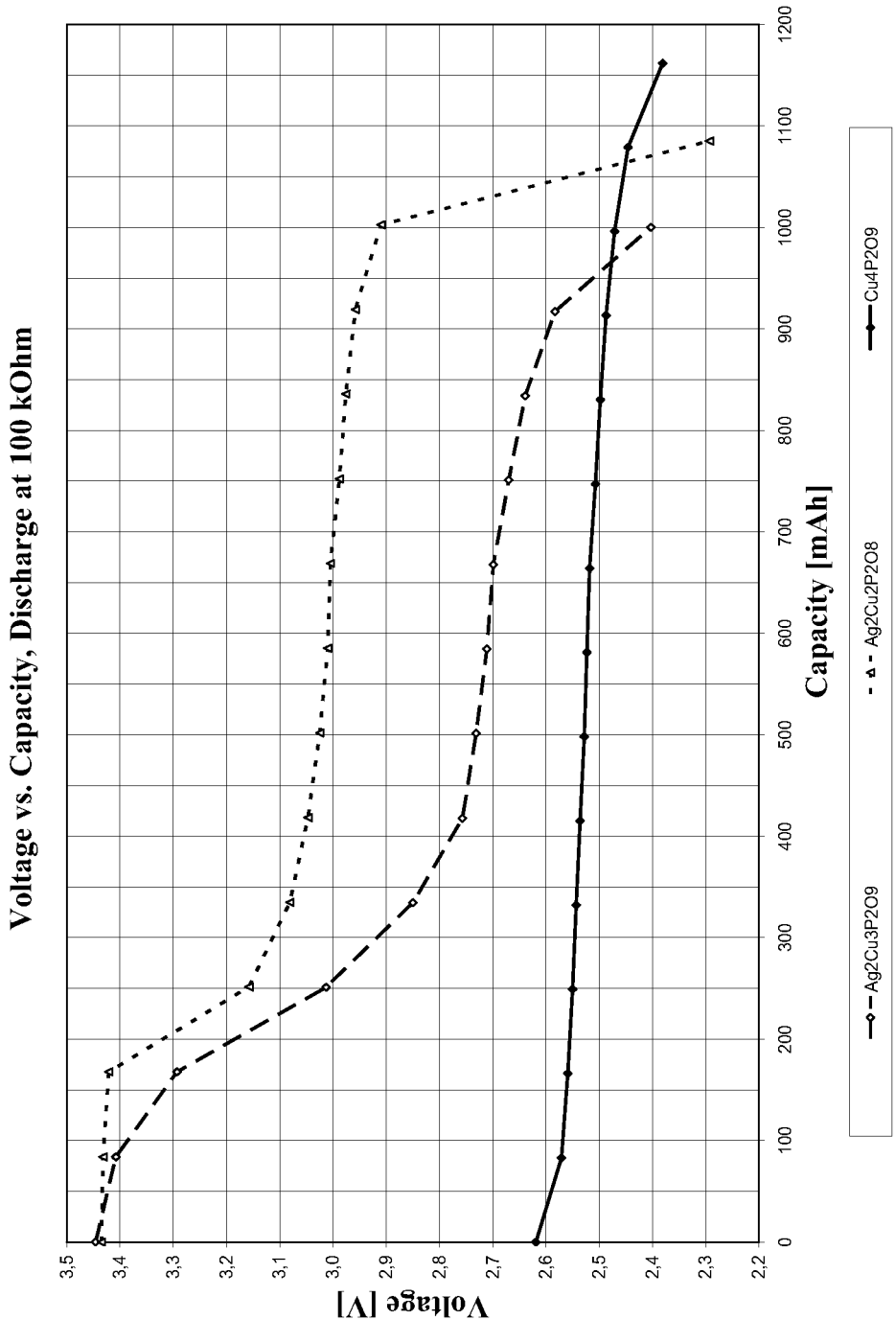
FIG. 4 shows the cell voltage of two batteries (comprising a cathode according to Embodiment 4 or 5) according to the present invention and a battery (comprising a cathode according to the comparative example) that is not according to the present invention, as a function of the electric charge (capacity) that is drawn given discharge across a load of 100 kOhm.
Figure 5:
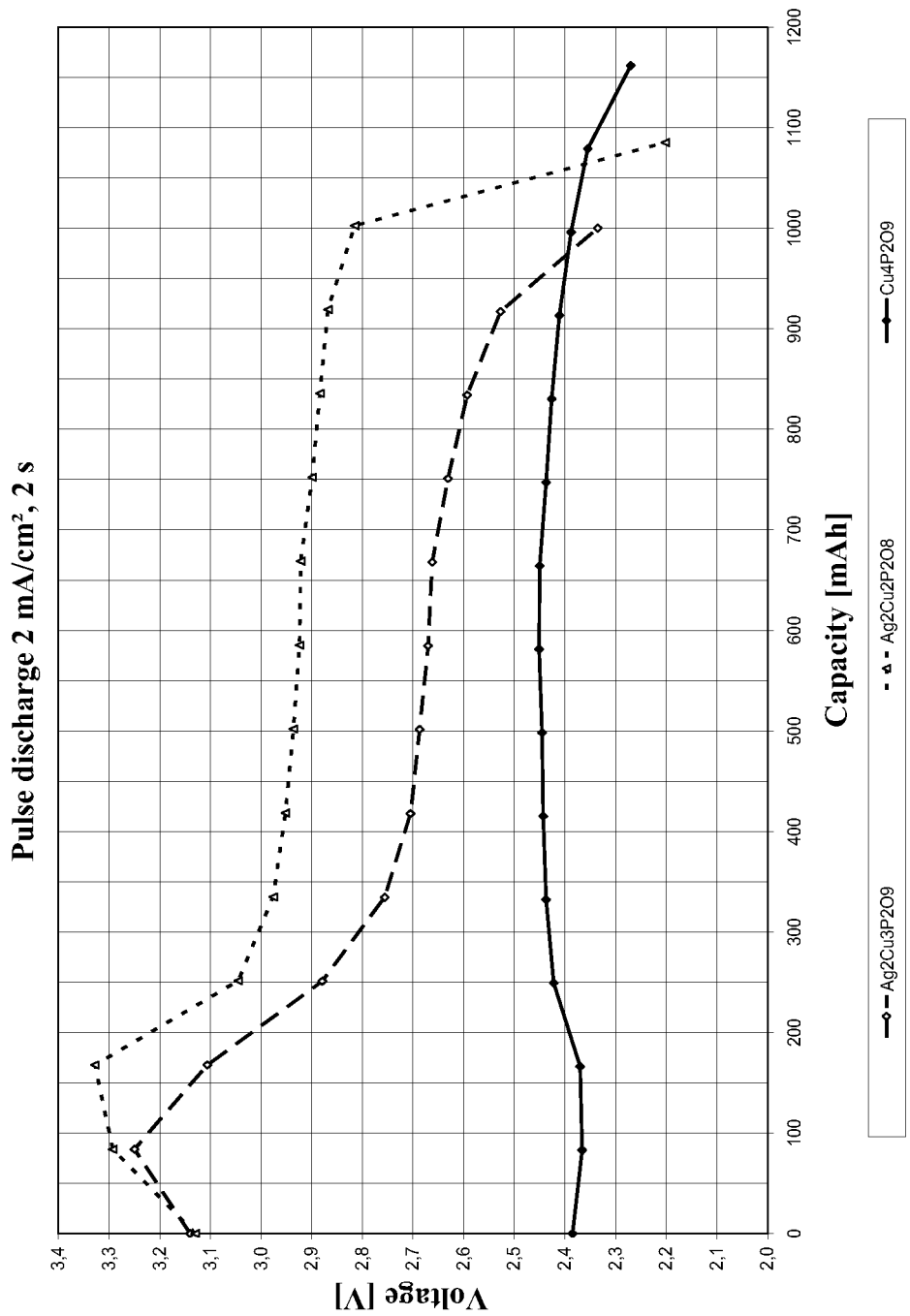
FIG. 5 shows the cell voltage of two batteries (cathode according to Embodiment 4 or 5) according to the present invention and a battery (comprising a cathode according to the comparative example) that is not according to the present invention, as a function of the electric charge (capacity) that is drawn given pulse discharge (pulse current 2 mA/cm$^2$, pulse duration 2 sec).

As shown in FIGS. 1 and 4, the batteries according to the present invention, and which are depicted in Embodiments 1 to 5, have a higher cell voltage at the onset of the discharge process and over the further course thereof than do the batteries not according to the present invention, which were utilized in the Comparative Example. This also applies for the discharge with pulse load, see FIGS. 2 and 5. The greater the portion of $Ag_2Cu_2P_2O_8$ (Ia) or $Ag_2Cu_3P_2O_9$ (Ib) in the active material of the cathode, the greater the capacity range is in which the voltage does not fall below 2.6 V despite pulse load.

Figure 3:
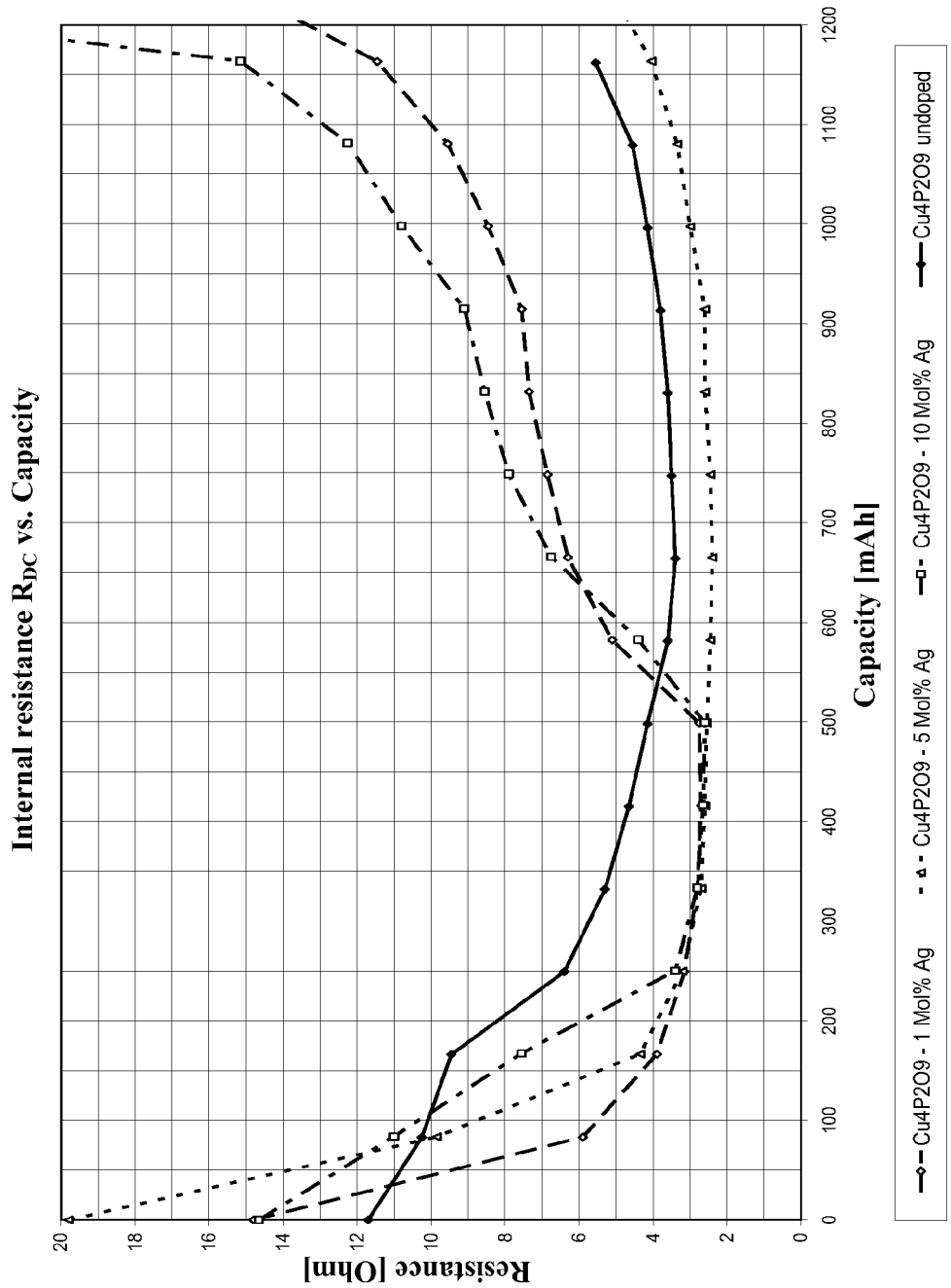
FIG. 3 shows the internal resistance of various batteries (comprising a cathode according to Embodiment 1, 2 or 3) according to the present invention and a battery (comprising a cathode according to the comparative example) that is not according to the present invention, as a function of the electric charge (capacity) that is drawn.
Figure 6:
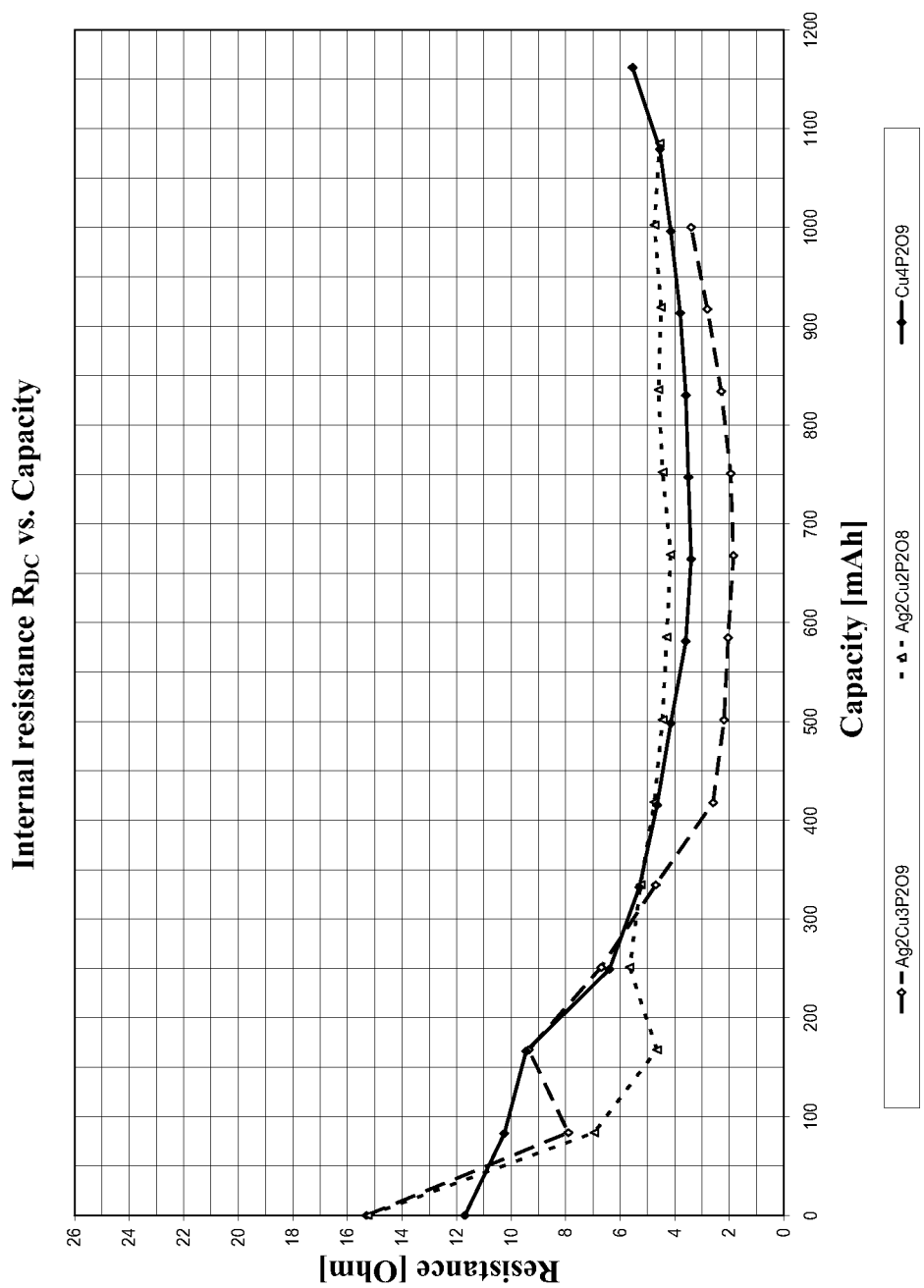
FIG. 6 shows the internal resistance of two batteries (comprising a cathode according to Embodiment 4 or 5) according to the present invention and a battery (comprising a cathode according to the comparative example) that is not according to the present invention, as a function of the electric charge (capacity) that is drawn.

FIGS. 3 and 6 show that the internal resistance of the batteries according to the present invention at the onset of discharge drops off much more rapidly than is the case in Comparative Example 1, due to the metallic silver that is formed.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range.

We claim:

1. An active material for an electrode of a galvanic element, comprising one or more compounds represented by the formula:

$$Me_xCu_{n-x/2}P_2O_{5+n} \tag{I},$$

wherein the following applies:
  Me is a monovalent metal comprising silver,
  $1 < x \leq 6$,
  $1 \leq n \leq 6$, and
  $n > x$,
wherein the active material further comprises one or more compounds represented by the formula $Cu_mP_2O_{5+m}$ (II), wherein: $1 < m < 6$.

2. An active material for an electrode of a galvanic element, comprising one or more compounds represented by the formula:

$$Me_xCu_{n-x/2}P_2O_{5+n} \tag{I},$$

wherein the following applies:
  Me is a monovalent metal comprising silver,
  $1 < x \leq 6$,
  $1 \leq n \leq 6$, and
  $n > x$,
wherein the active material further comprises:
  a continuous phase represented by the formula $Cu_mP_2O_{5+m}$ (II), wherein: $1 < m < 6$; and
  one or more disperse phases represented by the formula $Me_xCu_{n-x/2}P_2O_{5+n}$ (I).

3. An active material for an electrode of a galvanic element, comprising one or more compounds represented by the formula:

$$Me_xCu_{n-x/2}P_2O_{5+n} \quad (I),$$

wherein the following applies:
Me is a monovalent metal comprising silver,
$1<x\le 6$,
$1<n\le 6$, and
$n>x$,
wherein the active material further comprises:
a continuous phase represented by the formula $Cu_4P_2O_9$ (IIa); and
a disperse phase represented by the formula $Ag_2Cu_2P_2O_8$ (Ia) or a disperse phase represented by the formula $Ag_2Cu_3P_2O_9$ (Ib), or both.

4. The active material according to claim 3, wherein the portion of silver in the disperse phase represented by the formula (Ia) or (Ib) is 1 mol% to 10 mol% based on the content of copper in the continuous phase represented by the formula (IIa).

5. A chemical compound represented by the formula $Me_xCu_{n-x/2}P_2O_{5+n}$ (I) wherein the following applies:
Me is a monovalent metal comprising silver,
$1<x\le 6$,
$1<n\le 6$, and
$n>x$,
wherein the chemical compound further comprises one or more compounds represented by the formula $Cu_mP_2O_{5+m}$ (II), wherein: $1<m<6$.

6. The chemical compound according to claim 5, wherein the compound represented by the formula $Me_xCu_{n-x/2}P_2O_{5+n}$ (I) $Ag_2Cu_2P_2O_8$ (Ia) or $Ag_2Cu_3P_2O_9$ (Ib).

7. A method for the production of an active material as defined in claim 3, comprising the steps:
providing a mixture comprising the starting materials:
copper oxide CuO;
a thermally decomposable salt containing phosphate ions, said phosphate ions comprising ammonium hydrogenphosphate; and
a silver compound;
in a stoichiometry that is appropriate for the desired composition:
homogenizing the mixture;
providing a single-step or multi-step thermal treatment of the mixture, wherein the number, the particular duration, and the particular temperature of the steps of the thermal treatment are selected such that a material as defined in claim 5 is formed; and
homogenizing the thermally treated mixture, if necessary.

8. A method for the production of a chemical compound as defined in claim 6, comprising the steps:
providing a mixture comprising the starting materials:
copper oxide CuO;
a thermally decomposable salt containing phosphate ions, said phosphate ions comprising ammonium hydrogenphosphate; and
a silver compound;
in a stoichiometry that is appropriate for the desired composition:
homogenizing the mixture;
providing a single-step or multi-step thermal treatment of the mixture, wherein the number, the particular duration, and the particular temperature of the steps of the thermal treatment are selected such that a chemical compound as defined in claim 6 is formed; and
homogenizing the thermally treated mixture, if necessary.

9. A mixture for producing an electrode for a galvanic element, comprising:
(i) an active material as defined in claim 1; and
(ii) one or more conductive additives; and/or
(iii) one or more binding agents; and
(iv) optionally, one or more dispersing agents.

10. A mixture for producing an electrode for a galvanic element, comprising:
(i) one or more compounds as defined in claim 5, and
(ii) one or more conductive additives; and/or
(iii) one or more binding agents; and
(iv) optionally, one or more dispersing agents.

11. A galvanic element for supplying power to a medical implant comprising electronic components, comprising an electrode comprising a mixture as defined in claim 10.

12. A galvanic element for supplying power to a medical implant comprising electronic components, comprising an electrode comprising an active material comprising one or more compounds represented by the formula $Me_xCu_{n-x/2}P_2O_{5+n}$ (I), wherein:
Me is a monovalent metal comprising silver;
$1<x\le 6$;
$1<n\le 6$; and
$n>x$.
wherein the active material further comprises one or more compounds represented by the formula $Cu_mP_2O_{5+m}$ (II), wherein: $1<m<6$.

13. A galvanic element for supplying power to a medical implant comprising electronic components, comprising one or more first compounds represented by the formula $Me_xCu_{u-x/2}P_2O_{5+n}$ (I) wherein:
Me is a monovalent metal comprising silver;
$1<x<6$;
$1<n<6$; and
$n>x$,
wherein the first compounds are one or both compounds of the group consisting of $Ag_2Cu_2P_2O_8$ (Ia) and $Ag_2Cu_3P_2O_9$ (Ib), and
one or more second compounds represented by the formula $Cu_mP_2O_{5+m}$ (II), wherein:
$1<m<6$.

14. A galvanic element for supplying power to a medical implant comprising electronic components, comprising an electrode comprising a mixture as defined in claim 10, and comprising a second electrode containing metallic lithium as active material.

15. A galvanic element according to claim 11, wherein the galvanic element comprises a battery.

* * * * *